United States Patent
Park

(10) Patent No.: US 10,293,793 B2
(45) Date of Patent: May 21, 2019

(54) WASHER NOZZLE FOR VEHICLE

(71) Applicant: Hyundai Motor Company, Seoul (KR)

(72) Inventor: Jong Min Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 209 days.

(21) Appl. No.: 15/205,347

(22) Filed: Jul. 8, 2016

(65) Prior Publication Data

US 2017/0166170 A1   Jun. 15, 2017

(30) Foreign Application Priority Data

Dec. 14, 2015   (KR) .................. 10-2015-0178085

(51) Int. Cl.
| | | |
|---|---|---|
| *B60S 1/52* | (2006.01) | |
| *B05B 17/06* | (2006.01) | |
| *B05B 15/52* | (2018.01) | |
| *B05B 1/14* | (2006.01) | |

(52) U.S. Cl.
CPC ............... *B60S 1/52* (2013.01); *B05B 15/52* (2018.02); *B05B 17/0623* (2013.01); *B05B 1/14* (2013.01)

(58) Field of Classification Search
CPC ... B60S 1/52; B05B 17/0623; B05B 17/0646; B05B 17/0607; B05B 17/0638; B05B 17/063; B05B 17/06
USPC ......... 239/102.1, 102.2, 370, 337, 340, 343, 239/284.1
See application file for complete search history.

(56) References Cited

U.S. PATENT DOCUMENTS

| | | | | |
|---|---|---|---|---|
| 5,798,599 | A * | 8/1998 | Harwood | ............... B06B 1/0611 |
| | | | | 310/323.01 |
| 6,964,647 | B1 * | 11/2005 | Babaev | ................ A61M 11/005 |
| | | | | 601/2 |
| 2005/0045740 | A1 * | 3/2005 | Takemoto | ................. B60S 1/52 |
| | | | | 239/284.1 |
| 2016/0213866 | A1 * | 7/2016 | Tan | ...................... A61M 11/005 |

FOREIGN PATENT DOCUMENTS

| | | | |
|---|---|---|---|
| JP | | 2963843 B2 | 10/1999 |
| JP | | 3147805 B2 | 3/2001 |
| JP | | 2007-245129 A | 9/2007 |
| JP | | 2013-230429 A | 11/2013 |
| KR | | 1999-006449 U | 2/1999 |
| KR | 10-2010-0089641 A | | 8/2010 |

(Continued)

*Primary Examiner* — Darren W Gorman
*Assistant Examiner* — Qingzhang Zhou
(74) *Attorney, Agent, or Firm* — Mintz Levin Cohn Ferris Glovsky and Popeo, P.C.; Peter F. Corless

(57) ABSTRACT

A washer nozzle for a vehicle is provided. The washer nozzle improves an ejection disorder due to external freezing of a washer ejection port that ejects washer fluid. The washer nozzle, removes ice and foreign substances frozen onto the surface of a washer ejection port by utilizing an ultrasonic vibration generated by an ultrasonic transducer disposed within an interior of the washer nozzle. The washer nozzle includes a nozzle cover with washer ejection ports and a nozzle body with washer fluid passages. The ultrasonic transducer is configured to generate an ultrasonic vibration disposed within the nozzle body. The ultrasonic transducer disposed beneath the lower portion of the washer ejection ports is configured to provide ultrasonic vibration toward the washer ejection ports.

4 Claims, 5 Drawing Sheets

(56) References Cited

FOREIGN PATENT DOCUMENTS

| KR | 10-1262591 B1 | 5/2013 |
| KR | 10-2013-0091430 A | 8/2013 |
| KR | 2014-0020091 A | 2/2014 |

* cited by examiner

WASHER NOZZLE FOR VEHICLE

CROSS-REFERENCE TO RELATED APPLICATION

This application claims under 35 U.S.C. § 119(a) the benefit of priority to Korean Patent Application No. 10-2015-0178085 filed on Dec. 14, 2015, the entire contents of which are incorporated herein by reference.

BACKGROUND (a) Technical Field

The present disclosure relates to a washer nozzle for a vehicle and more particularly, to a washer nozzle for a vehicle that improves ejection disorder due to external freezing of a washer ejection port upon ejection of the washer fluid.

(b) Background Art

Generally, a washer nozzle ejects washer fluid onto the windshield of a motor vehicle to remove foreign substances on the windshield to provide a front view for a driver. The washer nozzle ejects an appropriate amount of washer fluid onto a wide area of the windshield glass in a minimal time duration. Conventional washer nozzles typically eject washer fluid onto the windshield glass through a washer ejection port assembled to a discharge port of a nozzle cover. During extreme cold temperatures, external freezing of the washer injection port may occur and prevent proper function. For example, to prevent ejection disorder that may occur due to external freezing of the washer ejection port in severe cold weather, a heating element may be used to transfer heat to the washer ejection port to thaw the washer ejection port. However, heat generated from the heating element is lost by internal and external environments of the washer nozzle in the process of being transferred to the washer ejection port. Namely, the heat loss inhibits the performance of ice thawing. Accordingly, it may be difficult to secure a front view field of vision for a driver due to the external freezing of the washer eject port.

The above information disclosed in this section is merely for enhancement of understanding of the background of the invention and therefore it may contain information that does not form the prior art that is already known in this country to a person of ordinary skill in the art.

SUMMARY

The present invention provides a washer nozzle for a vehicle which may remove ice and foreign substances frozen onto the surface of a washer ejection port by utilizing an ultrasonic vibration generated by an ultrasonic transducer disposed within the interior of the washer nozzle.

Accordingly, in one aspect, the present invention provides a washer nozzle for a vehicle that may include a nozzle cover with washer ejection ports and a nozzle body with washer fluid passages. An ultrasonic transducer may be configured to generate ultrasonic vibration and may be disposed within an interior of the nozzle body. Further, the ultrasonic transducer may be arranged beneath the lower portion of the washer ejection ports and may be configured to provide ultrasonic vibration toward the washer ejection ports.

According to an exemplary embodiment of the present invention, the ultrasonic transducer may include a piezoelectric sensor unit having an electrode member that may be configured to apply an electric current from an external power source and a piezoelectric layer stacked beneath the lower portion of the electrode member that may be configured to generate ultrasonic vibration by a potential difference of the electrode member. A first matching layer may be stacked on the upper portion of the electrode member at the uppermost layer and may be configured to amplify and transmit the ultrasonic vibration generated at the piezoelectric layer to the washer ejection ports. A second matching layer may be stacked beneath the lower portion of the piezoelectric layer at the lowermost layer and may be configured to attenuate vibration that may be transmitted to the lower portion of the nozzle body.

Furthermore, according to another exemplary embodiment of the present invention, the first matching layer may be coupled with an amplification layer having a horn that may be connected to the washer ejection ports. The horn may be formed to be tapered with a tip that gradually narrows. Furthermore, according to another exemplary embodiment of the present invention, the ultrasonic transducer may be disposed within the interior of the nozzle body with a damper disposed at the front portion of the washer fluid passages. The damper may be configured to attenuate ultrasonic vibration transmitted to the nozzle body. The washer nozzle for a vehicle may prevent a washer fluid ejection disorder due to external freezing of the washer ejection port and may allow a driver to secure a front view in extreme cold temperatures and may enhance the marketability of the vehicle.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1A:
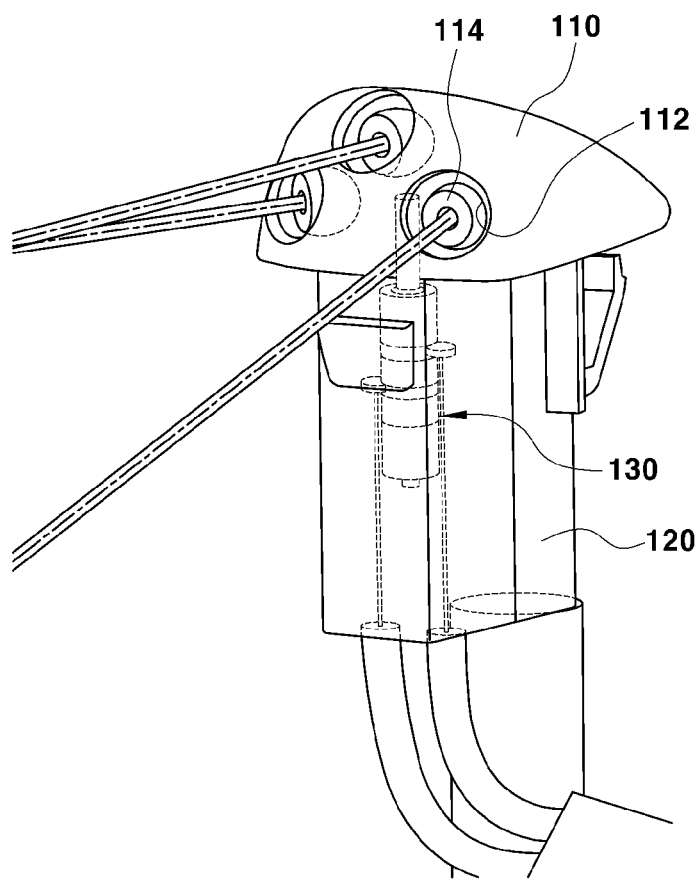
FIGS. 1A and 1B are exemplary perspective views of a washer nozzle according to an exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and exemplary embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below. The terminology used herein is for the purpose of describing particular embodiments only and is not intended to be limiting of the invention. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1B:
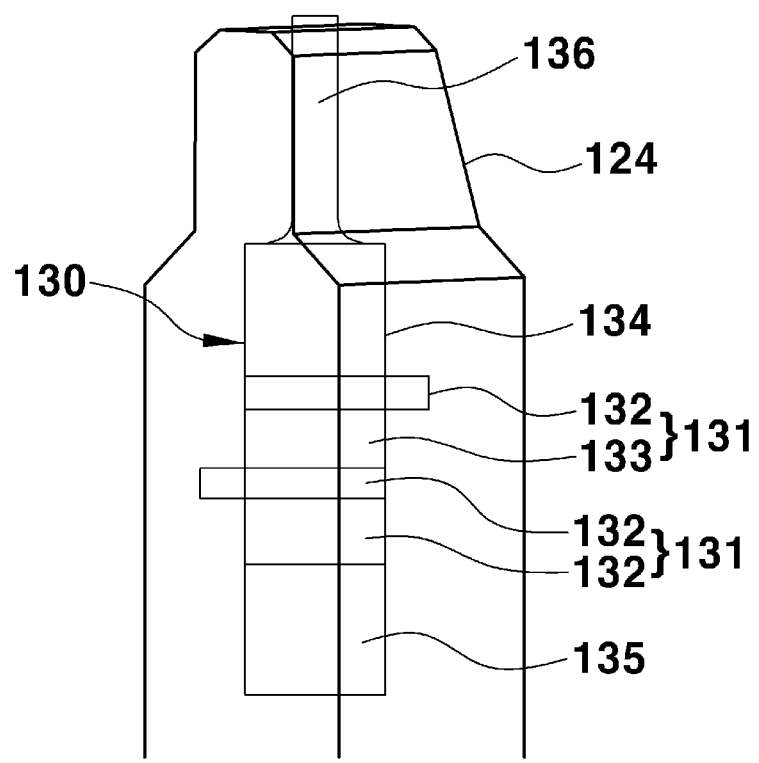
Figure 2:
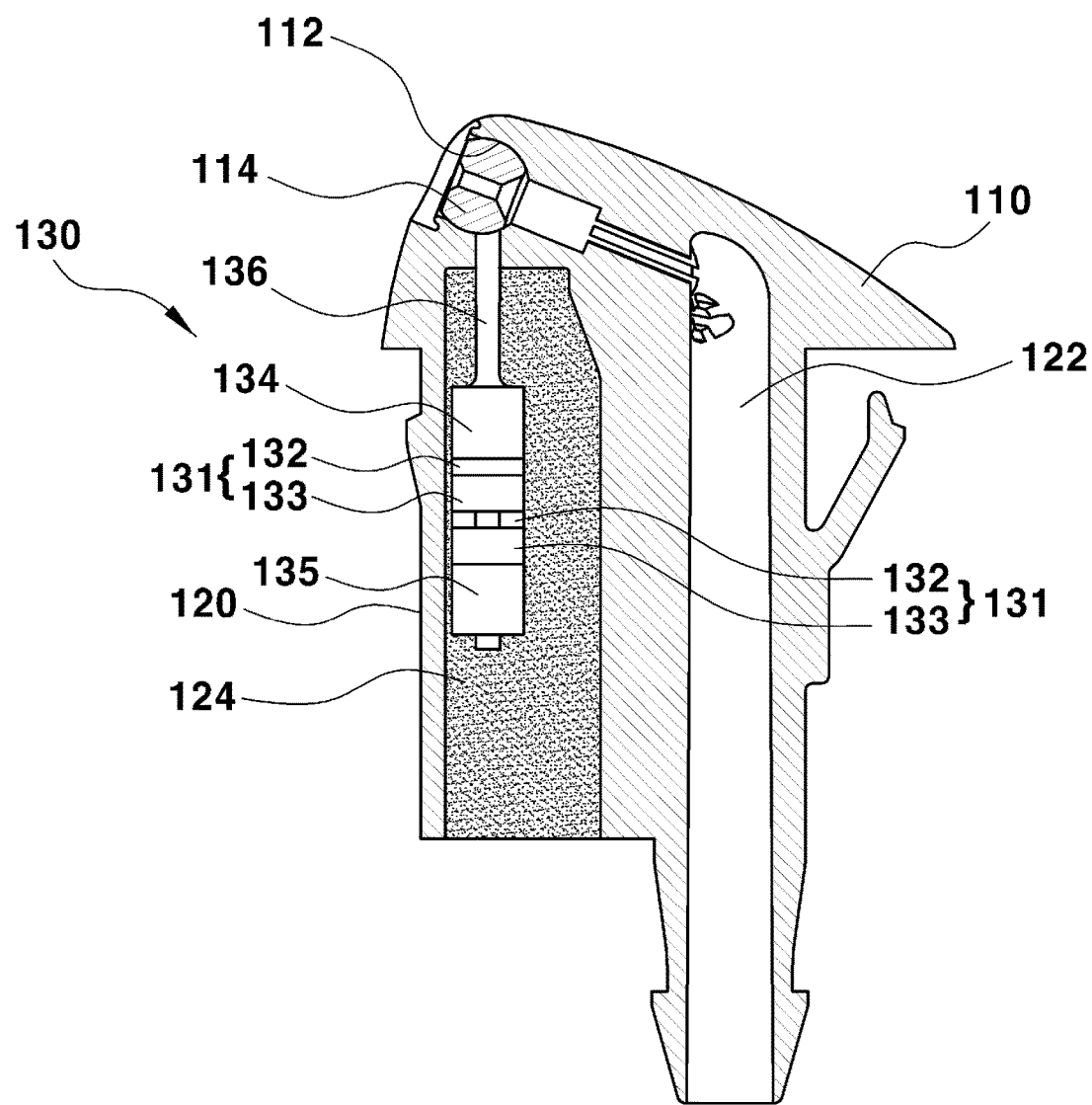
FIG. 2 is an exemplary sectional view of a washer nozzle according to an exemplary embodiment of the present invention.

Referring to FIGS. 1A, 1B and 2, a washer nozzle according to an exemplary embodiment of the present invention may be designed to remove from the drivers view ice and foreign substances such as dust and the like, which are frozen to the surface of a washer ejection port 114. For example, an ultrasonic transducer 130 may be disposed within the interior of the washer nozzle, and may be configured to generate a high vibration with a low voltage power. In particular, the washer nozzle may include a structure that removes foreign substances at the exterior of the washer ejection port 114 by an ultrasonic vibration generated through a piezoelectric sensor unit 131 that may be configured to convert electric pulses generated by a potential difference into vibration.

In particular, the washer nozzle may include a combination of a nozzle cover 110 disposed at an upper portion of the nozzle cover and a nozzle body 120 disposed at a lower portion the nozzle cover. The nozzle cover 110 may include a plurality of discharge ports 112, and washer ejection ports 114 that may be configured to eject washer fluid. For example, three washer ejection ports 114 may be disposed in a triangular arrangement and may be coupled to each of the discharge ports 112. The nozzle body 120 may be formed to include washer fluid passages 122 and the washer ejection port 114 may be configured to be in fluid communication with the washer fluid passages 122. In addition, an ultrasonic transducer 130 may be disposed within the interior of the nozzle body 120. In particular, the ultrasonic transducer 130 may be disposed under the lower portion of the washer ejection ports 114 within the front portion of the washer fluid passages 122.

Figure 3:
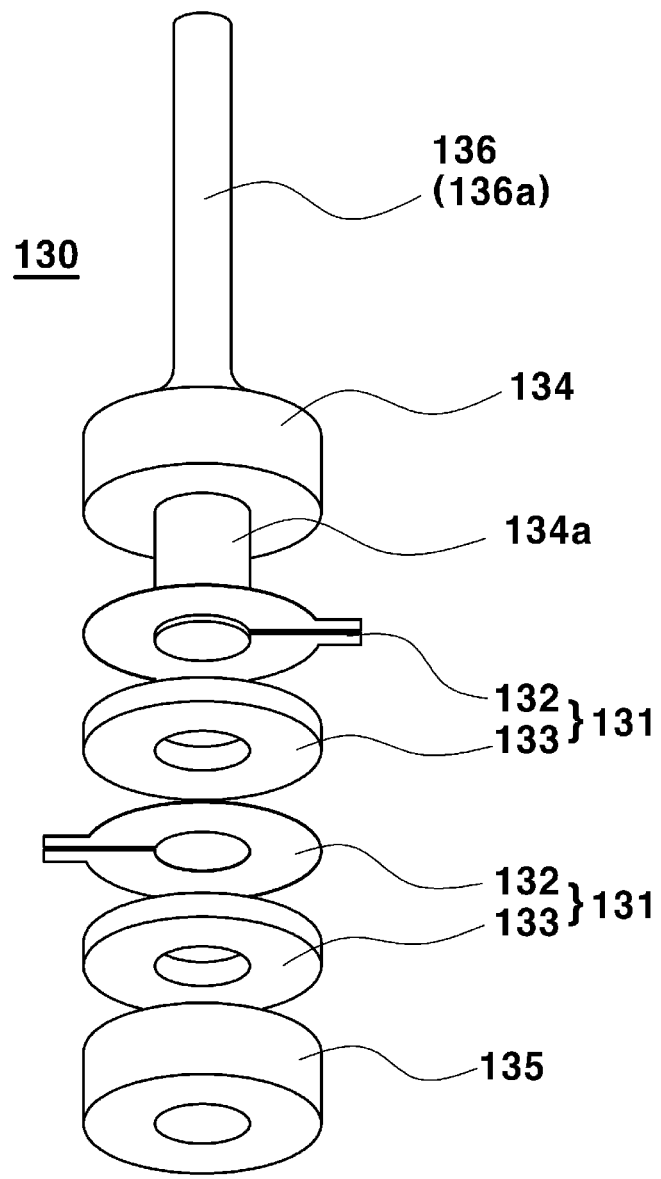
FIG. 3 is an exemplary exploded perspective view of an ultrasonic transducer according to an exemplary embodiment of the present invention.

Further, the ultrasonic transducer 130 may be configured to generate ultrasonic vibration within the interior of the nozzle body 120 and may provide the ultrasonic vibration to the washer ejection ports 114. The ultrasonic transducer, as shown in FIGS. 2 and 3, may include a piezoelectric sensor unit 131 and first and second matching layers 134 and 135 that may be disposed to surround the piezoelectric sensor unit 131 from the top and bottom. The piezoelectric sensor unit 131 may include an electrode member 132 configured to apply an electric current from an external power source. A piezoelectric layer 133 may be stacked beneath the electrode member 132 and may be configured to generate ultrasonic vibration by a potential difference of the electrode member 132. In other words, to generate ultrasonic vibration based on electric current that is applied from an external power source, the ultrasonic transducer 130 may include an electrode member 132 and a piezoelectric layer 133 that may be stacked vertically.

In particular, the ultrasonic transducer 130 may include a structure having two piezoelectric sensor units 131 vertically stacked. The electrode members 132 of each of the piezoelectric sensor units 131 may be formed as a structure that may be configured to apply an electric current through a wire 137 between a cathode terminal at a first side end of the electrode member and an anode terminal at a second side end of the electrode member. Accordingly, the application of electric current from the external power source may generate a potential difference between the first side end and the second side end.

The piezoelectric layer 133 may be configured to generate an ultrasonic vibration by a potential difference generated at the electrode member 132 stacked on the piezoelectric layer via surface contact. In other words, the piezoelectric layer may be formed by processing a piezoelectric material such as a piezoelectric ceramic, which has a piezoelectric effect that may be configured to convert electrical vibration (e.g., pulse) of alternating current into mechanical vibration. The piezoelectric layer 133 may be formed in a flat plate-shaped and annular shape or the like. Further, a central portion of the piezoelectric layer 133 may be perforated. The electrode member 132 may be formed in a flat plate-shaped and annular shape. A perforated central portion of the electrode member 132 may correspond to the piezoelectric layer 133.

A first matching layer 134 may be disposed on the upper portion of the electrode member at the uppermost layer and may be configured to transmit the ultrasonic vibration generated at the piezoelectric layer 133 to the washer ejection ports 114. Moreover, second matching layer 135 may be disposed beneath the lower portion of the piezoelectric layer at the lowermost layer and may be configured to attenuate the rearward vibration that may be transmitted toward the lower portion of the nozzle body 120. The first and second matching layers 134 and 135 may be formed by machining a metal material.

For example, the first matching layer 134 may be configured to amplify the waveform of ultrasonic vibration having a periodic waveform compressed and expanded. In particular, the periodic waveform may be generated at the piezoelectric layer 133 by the intrinsic impedance of the metal material and may correspond to the the consistency of the waveform. Further, the vibration may be transmitted to the washer ejection ports 114. In other words, the first matching layer 134 may be configured to transmit the vibration characteristic of the piezoelectric layer 133 toward the washer ejection ports 114 and may therefore secure the consistency. The second matching layer 135 may be configured to attenuate the vibration that may be transmitted to the lower portion of the nozzle body 120 by the intrinsic impedance of the metal material. In particular, the materials of the first and second matching layers 134 and 135 are not necessarily limited to the same metal material.

The first and second matching layers 134 and 135 may support two piezoelectric sensor units 131 that may be positioned in a stacked structure between the matching layers, from the top and bottom in a form of surface contact. In particular, an engagement protrusion 134a may pass through central portions of the piezoelectric sensor unit 131 and the second matching layer 135 may be formed to protrude from the bottom of the first matching layer 134. The engagement protrusion 134a may be inserted into and coupled to the central portion of the second matching layer 135. In particular, the engagement protrusion 134a may prevent interference to electric current flow within the electrode member 132. Accordingly, the engagement protrusion 134a may be machined with a non-metallic material unable to conduct electric current and may be attached to the bottom of the first matching layer 134.

Furthermore, an amplification layer 136 may include a horn 136a directly connected to the washer ejection port 114 may be coupled to the top of the first matching layer 134. The horn 136a may be formed to be tapered with a tip that gradually narrows along a length direction thereof. Accordingly, the vibration may be transmitted and amplified to a wide area of the amplification layer 136 through the first matching layer 134 that converges on a narrow area of the amplification layer. In other words, the ultrasonic vibration that has been amplified through the first matching layer 134 may be configured to be amplified once again in the amplification layer 136 and may be transmitted to the washer ejection port 114.

The amplification layer 136 may include a plurality of horns 136a with a branch based on the number of the washer ejection ports 114 that may be configured to eject the washer fluid and may be connected to each of the washer ejection ports 114. In particular, each of the horns 136a may be formed to be tapered to include a tip that gradually narrows. In other words, the configuration of the amplification layer 136 may be modified appropriately and formed, based on the number and geometry of the washer ejection ports 114.

Figure 4:
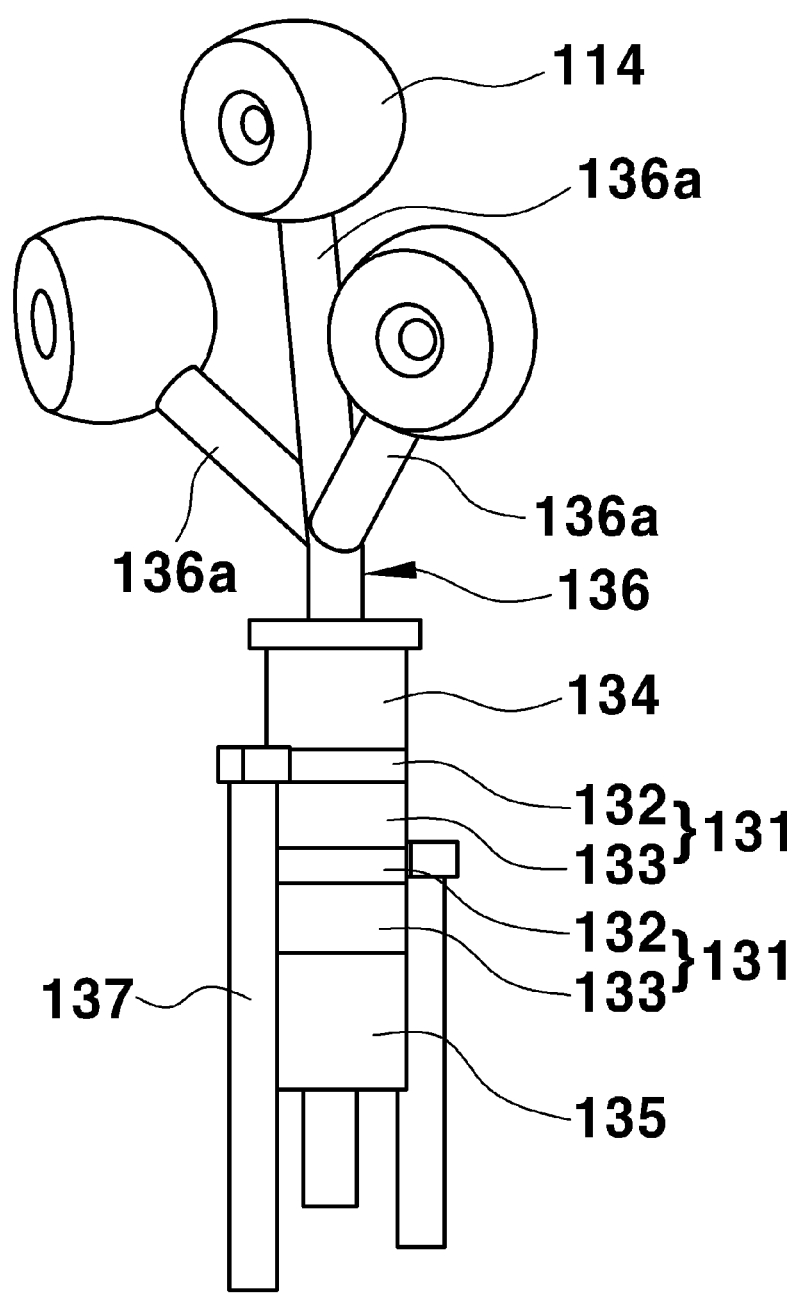
FIG. 4 is an exemplary diagram showing a connection configuration between an ultrasonic transducer and a washer ejection ports, according to an exemplary embodiment of the present invention.

Although a washer nozzle illustrated in FIG. 4 may include an amplification layer 136 having three horns 136a since the washer nozzle includes a three-way washer nozzle having three washer ejection ports 114, however it should be noted that the present invention is not limited thereto. The ultrasonic transducer 130 as illustrated above may be disposed within the interior of the nozzle body 120 and may include a damper 124, disposed beneath the lower portion of the washer ejection port 114 at the front portion of a washer fluid passage 122.

The damper 124 may be configured to attenuate the ultrasonic vibration that may be transmitted to the nozzle body 120 that encloses the ultrasonic transducer 130. The damper may be inserted into and coupled to the interior of the nozzle body 120 when the ultrasonic transducer 130 is disposed within the damper. Further, the damper may be disposed; beneath the lower portion of the washer ejection port 114 of a nozzle cover 110 at the front portion of the washer fluid passage 122 of the nozzle body 120 and may be supported to enable the horn 136a of the ultrasonic transducer 130 to contact the washer ejection port 114.

The ultrasonic transducer 130 as described above may include an ultrasonic vibration generated at the piezoelectric sensor units 131. The ultrasonic vibration may be configured to be amplified in the amplification layer 136 and then may be configured to be transmitted toward the washer ejection port 114. In particular, the vibration may be transmitted to an air gap, (e.g., a medium boundary layer) disposed between the washer ejection port 114 and an ice layer formed on the surface of the washer ejection port 114 and may enable a fracture in the ice layer and may facilitate melting of the frozen washer ejection port 114.

The ultrasonic transducer 130 as above may be configured to attenuate vibration in any other direction except the vibration in the direction transmitted toward the washer ejection port 114 through the horn 136a of the amplification layer 136 via the damper 124 and the second matching layer 135. The washer nozzle with the ultrasonic transducer 130 disposed therein may be configured to thaw the washer ejection port 114 in a minimal time duration by utilizing a characteristic of a wavelength of an ultrasonic wave. Additionally, since the washer nozzle may realize a high vibration using a low voltage power, the size of the washer nozzle may be reduced.

The invention has been described in detail with reference to exemplary embodiments thereof. However, it will be appreciated by those skilled in the art that the scope of the present invention is not limited to the exemplary embodiments as mentioned above and that changes may be made in these exemplary embodiments without departing from the principles and spirit of the invention, the scope of which is defined in the appended claims and their equivalents.

What is claimed is:

1. A washer nozzle for a vehicle, comprising:
a nozzle cover having a plurality of washer ejection ports; and
a nozzle body having a plurality of washer fluid passages,
wherein an ultrasonic transducer configured to generate ultrasonic vibration is disposed within an interior of the nozzle body and beneath a lower portion of the washer ejection ports and is configured to provide ultrasonic vibration toward the washer ejection ports,
wherein the ultrasonic transducer includes a piezoelectric sensor unit,
wherein the piezoelectric sensor unit includes an electrode member configured to apply electric current from an external power source and a piezoelectric layer stacked beneath a lower portion of the electrode member to generate ultrasonic vibration by a difference of the electrode member and a first matching layer disposed on the upper portion of the electrode member at an uppermost layer to amplify and transmit the ultrasonic vibration generated at the piezoelectric layer to the washer ejection ports, and the first matching layer is coupled thereon with an amplification layer having a horn directly connected to the washer ejection ports,
wherein the ultrasonic transducer further includes a second matching layer disposed beneath a lower portion of the piezoelectric layer at a lowermost layer to attenuate vibration transmitted to a lower portion of the nozzle body, and
wherein the ultrasonic transducer is disposed within the interior of the nozzle body with a damper disposed at a front of the washer fluid passages, and the damper is configured to attenuate ultrasonic vibration transmitted to the nozzle body.

2. The washer nozzle of claim 1, wherein a tip of the horn is formed to be tapered and gradually narrows.

3. The washer nozzle of claim 1, wherein an engagement protrusion passes through central portions of the piezoelectric sensor unit, and the second matching layer is formed to protrude from a bottom of the first matching layer.

4. The washer nozzle of claim 3, wherein the engagement protrusion is inserted into and coupled to a central portion of the second matching layer.

* * * * *